(12) United States Patent
Tanaka et al.

(10) Patent No.: US 7,625,145 B2
(45) Date of Patent: Dec. 1, 2009

(54) DATA DISPLAY METHOD OF DATA DISPLAY APPARATUS, DATA DISPLAY APPARATUS, DATA GENERATION APPARATUS HAVING THE SAME, AND SHEET PROCESSING APPARATUS

(75) Inventors: Seiji Tanaka, Azumino (JP); Makoto Takada, Shiojiri (JP); Shoji Takayama, Azumino (JP); Takayuki Uehara, Koshigaya (JP)

(73) Assignees: Seiko Epson Corporation, Tokyo (JP); King Jim Co., Ltd., Tokyo (JP)

( * ) Notice: Subject to any disclaimer, the term of this patent is extended or adjusted under 35 U.S.C. 154(b) by 658 days.

(21) Appl. No.: 11/400,537

(22) Filed: Apr. 6, 2006

(65) Prior Publication Data

US 2006/0228678 A1 Oct. 12, 2006

(30) Foreign Application Priority Data

Apr. 11, 2005 (JP) .............................. 2005-113941

(51) Int. Cl.
*B41J 3/32* (2006.01)
(52) U.S. Cl. ..................... 400/109.1; 400/76; 715/256
(58) Field of Classification Search ................. 400/76, 400/109.1, 483; 358/1.1; 715/255, 256
See application file for complete search history.

(56) References Cited

U.S. PATENT DOCUMENTS 4,840,567 A * 6/1989 Litt ............................ 434/114
6,086,273 A * 7/2000 Hong ........................ 400/109.1
2002/0009318 A1 * 1/2002 Maie ........................ 400/109.1

FOREIGN PATENT DOCUMENTS

JP 2001-088358 4/2001

OTHER PUBLICATIONS

Machine English Translation for JP 2001-088358.*

\* cited by examiner

*Primary Examiner*—Ren Yan
(74) *Attorney, Agent, or Firm*—Hogan & Hartson LLP (57) ABSTRACT

A data display method of a data display apparatus includes displaying a cursor for scrolling the preview display on an input character display region having an ink character region and a Braille character region while moving the displayed cursor; and previewing the label image on the basis of a cursor position of the cursor. The previewing of the label image previews the label image to display an image of the ink character indicated by the cursor positioned in a predetermined position of the preview region when the cursor is positioned on the ink character notation, and previews the label image to display an image of the Braille characters indicated by the cursor or an image of the Braille character corresponding to a translation of the Braille characters into the ink characters positioned in a predetermined position of the preview region when the cursor is positioned on the Braille character notation.

5 Claims, 8 Drawing Sheets

DATA DISPLAY METHOD OF DATA DISPLAY APPARATUS, DATA DISPLAY APPARATUS, DATA GENERATION APPARATUS HAVING THE SAME, AND SHEET PROCESSING APPARATUS

The entire disclosure of Japanese Patent Application No. 2005-113941, filed Apr. 11, 2005, is expressly incorporated by reference herein.

BACKGROUND

1. Technical Field

The present invention relates to a data display method of a data display apparatus for previewing a label image of a label (composite label) generated on the basis of input ink characters and input Braille characters in a predetermined preview region, the data display apparatus, a data generation apparatus having the same, and a sheet processing apparatus.

2. Related Art

A sheet processing apparatus is known in the related art, performing printing of both ink characters and Braille characters on the same sheet to be processed to generate a label written with both the ink characters and the Braille characters (See JP-A-2001-88358).

In addition, a typical word processor allows a printed result of a document written by the word processor to be previewed (i.e., to display an image) on a display screen so as to allow viewing of the printed result beforehand. Such a preview display function can be applied to the sheet processing apparatus to display the label image of the label to be generated on a display screen. In this case, when an ink character notation in accordance with the ink character input for the ink character printing and a Braille character notation in accordance with the Braille characters input for the Braille embossing or its translation into ink characters are displayed together with the previewed label image, it is possible to identify the input ink characters and Braille characters, and the label image indicating the output result which are associated with each other. Therefore, it is possible to improve the convenience of a user.

However, when the display screen disposed in the sheet processing apparatus is small, it is difficult to display the entire label image on the display screen in a previewing way. Due to the limited size of the display screen, it is assumed that the label image will be scroll-displayed. Further, since the label image to be scroll-displayed is associated with the ink character notation and the Braille character notation, it can be considered that a cursor is displayed on the display screen, and the label image is scroll-displayed on the basis of a cursor position of the ink character notation and the Braille character notation.

In general, since the Braille character notation needs to be on the basis of the Braille rule such as word spacing, and the Braille character must correspond to Hiragana characters (Katakana characters which are Japanese characters) and be distinguishable from alphanumeric or voiced sound symbols, inputting of Braille characters tends to require a greater number of characters (cells) than that of ink character notation. That is, a character shape and a character position of the ink character notation are different from those of the Braille character notation even if the character strings represent the same contents. In this case, when the label image is configured to be scroll-displayed on the basis of only one of the ink character notation and the Braille character notation, it is difficult to scroll-display the label image corresponding to a content of the other one of the ink character notation and the Braille character notation, which inconveniences the user. In addition, when a length of the character string in the ink character notation is significantly different from a length of the character string in the Braille character notation, if the label image is configured to be scroll-displayed on the basis of the ink character notation, the label image corresponding to the end of the character string of the Braille characters (the Braille character string is longer than the ink character string) cannot be displayed.

SUMMARY

An advantage of some aspects of the invention is that it provides a data display method of a data display apparatus capable of matching a label image (of a composite label) to both an ink character notation and a Braille character notation and scroll-displaying the same and scroll-displaying the entire label image even when a length of a character string in the ink character notation is different from a length of a character string in the Braille character notation, the data display apparatus, a data generation apparatus having the same, and a sheet processing apparatus.

According to a first aspect of the invention, the invention provides a data display method of a data display apparatus. The data display apparatus is used for forming a composite label having ink characters and Braille characters and displaying, on the same display screen, an ink character notation which represents the input ink characters in a predetermined ink character region, a Braille character notation which represents the input Braille characters in a predetermined Braille character region or the ink characters translated from the Braille characters in the predetermined Braille character region, and a preview display which displays a label image of the composite label in a predetermined preview region on the basis of the input ink characters and the Braille characters. The method includes: displaying a cursor for scrolling the preview display on an input character display region having the ink character region and the Braille character region while moving the displayed cursor; and previewing the label image on the basis of a cursor position of the cursor. In this case, the previewing of the label image previews the label image so as to display an image of the ink character indicated by the cursor positioned in a predetermined position of the preview region when the cursor is positioned on the ink character notation and previews the label image so as to display an image of the Braille characters indicated by the cursor or an image of the Braille character corresponding to a translation of the Braille characters into the ink characters positioned in a predetermined position of the preview region when the cursor is positioned on the Braille character notation.

According to a second aspect of the invention, the invention provides a data display apparatus. The data display apparatus is used for forming a composite label having ink characters and Braille characters and displaying, on the same display screen, an ink character notation which represents the input ink characters in a predetermined ink character region, a Braille character notation which represents the input Braille characters in a predetermined Braille character region or the ink characters translated from the Braille characters in the predetermined Braille character region, and a preview display which displays a label image of the composite label in a predetermined preview region on the basis of the input ink characters and the Braille characters. Further, the apparatus includes: cursor display device that scrolls the preview display on an input character display region having the ink character region and the Braille character region while moving the displayed cursor; and a preview control device that previews the label image on the basis of a cursor position of the cursor. In this case, the preview control device previews the label image so as to display an image of the ink character indicated by the cursor positioned in a predetermined position of the preview region when the cursor is positioned on the ink character notation, and previews the label image so as to display an image of the Braille character indicated by the cursor or an image of the Braille character corresponding to a translation of the Braille characters into the ink characters positioned in a predetermined position of the preview region when the cursor is positioned on the Braille character notation.

According to these structures, a preview display of the label image is controlled on the basis of a cursor position of the cursor. And the label (composite label) image is previewed so as to have an image of the ink character indicated by the cursor positioned in a predetermined position of the preview region when the cursor is positioned on the ink character notation, and is previewed so as to display an image of the Braille characters indicated by the cursor or an image of the Braille character corresponding to a translation of the Braille characters into the ink characters positioned in a predetermined position of the preview region when the cursor is positioned on the Braille character notation. Accordingly, a user can recognize the label image while having the label image correspond to the cursor position of the cursor. In addition, the whole label image can be displayed by scrolling regardless of the length of the character string in the ink character notation and the Braille character notation, which can thus bring convenience to the user.

According to a third aspect of the invention, the invention provides a data generation apparatus. The data generation apparatus includes the data display apparatus according to the second aspect, an ink character edition input device that edits and inputs the ink characters, and a Braille character edition input device that edits and inputs the Braille characters, and generates label data for creating the composite label on the basis of the input ink character and the Braille character. The data generation apparatus further includes an indication display device for indicating which one between the ink character and the Braille character is in a state capable of being edited on the basis of a cursor position of the cursor. In this case, the cursor indicates an edit input position on the ink character notation and the Braille character notation.

According to this structure, the indication display on the basis of the cursor position of the cursor allows the user to easily recognize which one between the ink character and the Braille character is capable of being edited and input. In addition, since the user can easily recognize of which the ink characters or the Braille characters are capable of being edited and input, edition input of the character is enabled on the ink character notation, and when there exists a limit in the edition input on the Braille character notation, the user can easily recognize whether the limit exists in the edition input of the character by means of the indication display. A method of the displaying the indication may include displaying a message that the edition input cannot be performed on the Braille character notation, displaying specific mark and symbol, and displaying the ink character notation and the Braille character notation in different display forms (e.g., one is positive-displayed and the other is negative-displayed).

In this case, the indication display device preferably negative-displays the Braille character notation as an indication display. According to this structure, the Braille character-notation is negative-displayed, so that user can recognize that a negative-displayed notation is the Braille character notation. When the edition input of the Braille character notation is limited (or impossible), the negative display is made to be associated with that the edition input of the negative display is limited, so that user can easily recognize that the edition input of the notation associated with the Braille is limited.

Further, in this case, the indication display device preferably displays the cursor on the ink character notation and on the Braille character notation as an indication display in different shapes from each other. According to this structure, the ink character notation and the Braille character notation are displayed with the cursors in different shapes, so that user can identify which one between the ink character notation and the Braille character notation is selected by the cursor on the basis of the shape of the cursor, that is, capable of being edition-input. In addition, when edition input of the Braille character notation is limited, the shape of the cursor is made to be associated with that the edition input of the Braille characters is limited, so that user can easily recognize that the edition input of the notation associated with the Braille is limited.

In this case, preferably, the data generation apparatus further includes a batch-erase device that collectively erases the Braille characters by triggering a predetermined operation when the cursor is positioned on the Braille character notation.

When a predetermined operations is performed while the cursor for the edition input is positioned on the Braille character notation, the input Braille character can be collectively erased, which improves the operability and convenience for a user when the Braille characters are not necessary.

According to a fourth aspect of the invention, the invention provides a sheet processing apparatus. The sheet processing apparatus includes: the data generation apparatus according to the third aspect; a printing device that performs ink character printing on a sheet to be processed on the basis of the input ink characters; and an embossing device that embosses Braille characters on the sheet on the basis of the input Braille characters.

According to this structure, the sheet processing apparatus according to an aspect of the invention has the label data generation apparatus described in any of the above aspects, so that the label data can be efficiently generated, and the user can efficiently generate a desired label (i.e., a composite label).

BRIEF DESCRIPTION OF THE DRAWINGS

The invention will be described with reference to the accompanying drawings, wherein like numbers reference like elements.

FIGS. 8A to 8C are explanatory diagrams of operations when a cursor is positioned at the end of the input Braille character display unit.

DESCRIPTION OF EXEMPLARY EMBODIMENTS

Hereinafter, a label forming apparatus of the present invention will be described with reference to accompanying drawings. The label forming apparatus is relatively small-sized and is usually put on a desk or the like, and performs ink character printing and Braille character embossing on a processing tape, so that it allows both of visually impaired persons and persons who are not visually impaired to recognize a Braille character label. In particular, the label forming apparatus performs ink character printing on the processing tape, cuts a portion where the printing is completed to obtain a tape piece that becomes the label, and then performs the Braille character embossing on the tape piece to generate the (Braille character) label.

Figure 1:
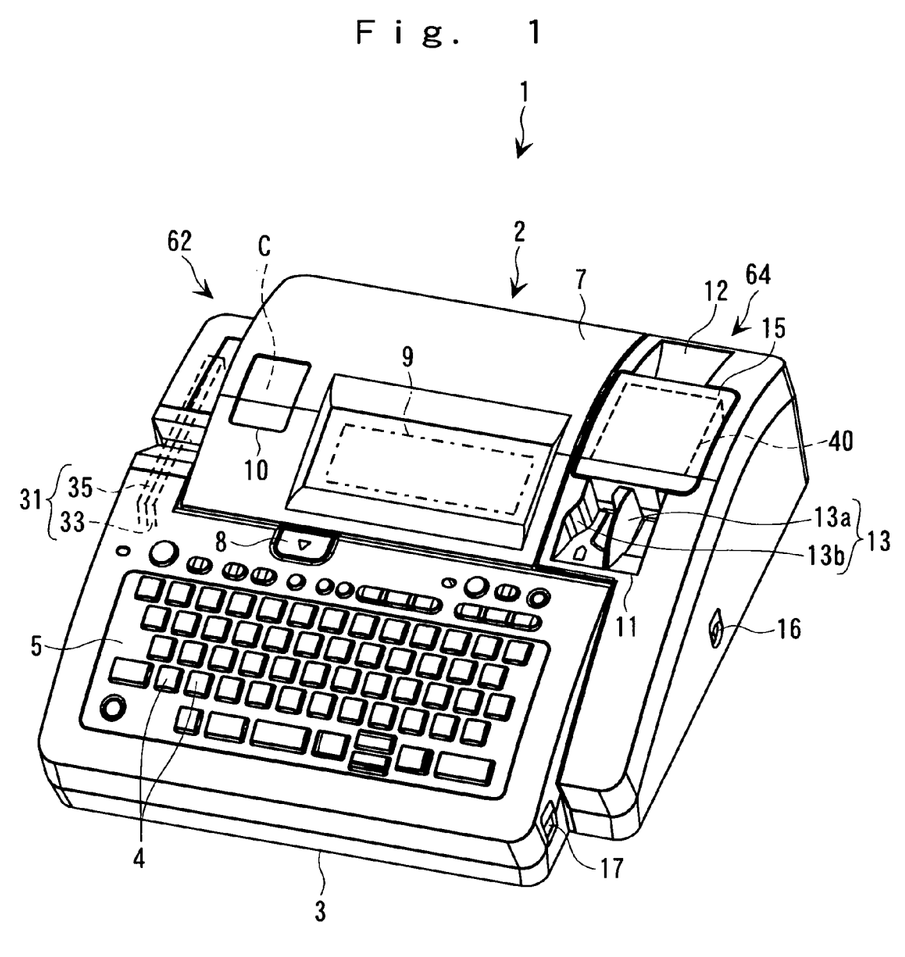
FIG. 1 is a perspective view of a label forming apparatus with its cover closed.
Figure 2:
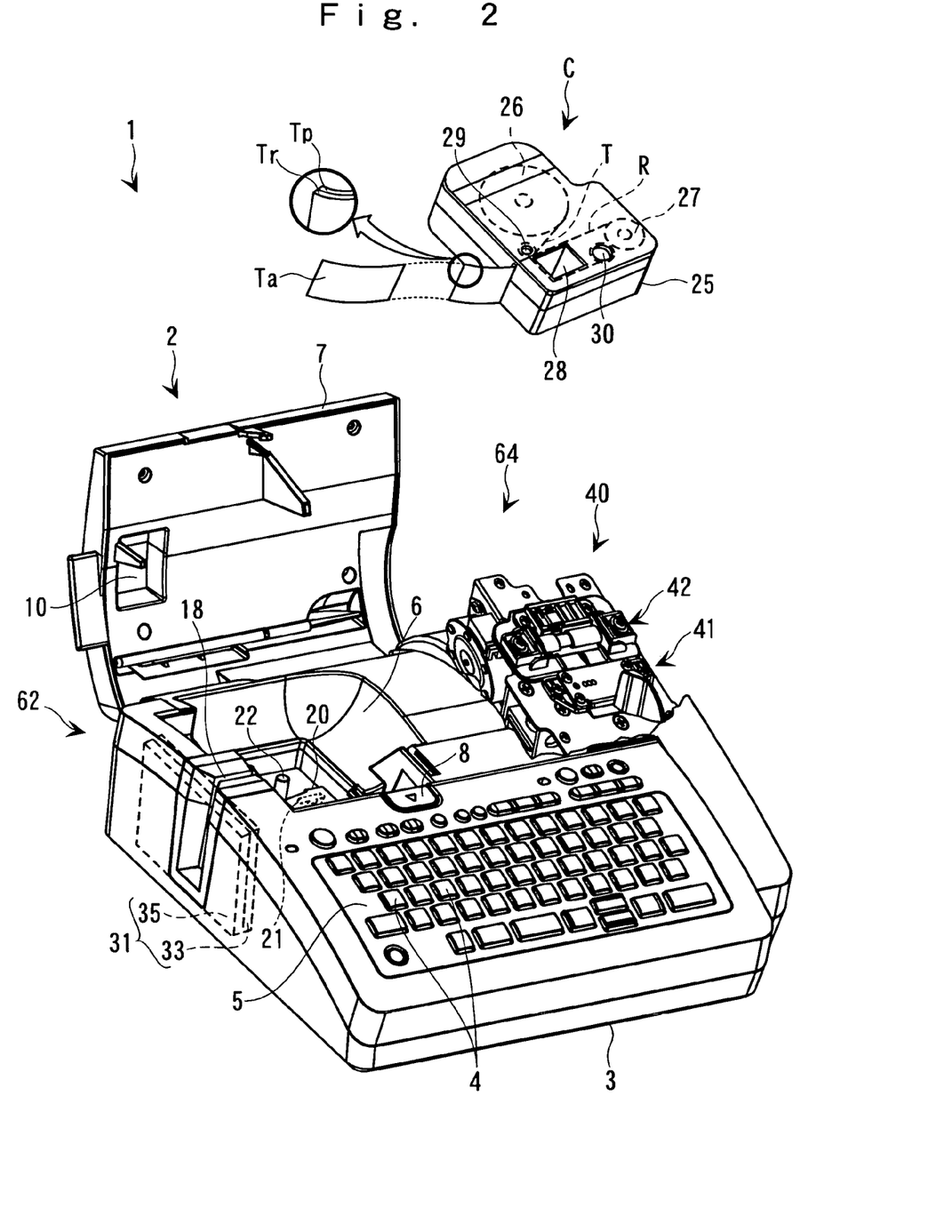
FIG. 2 is a perspective view of the label forming apparatus with its cover opened.

As shown in FIGS. 1 and 2, the label forming apparatus 1 includes an apparatus body 2 for performing printing of ink characters on the processing tape T and embossing of Braille characters on a tape piece Ta obtained from the processing tape T, and a tape cartridge C for receiving the processing tape T and an ink ribbon R. The tape cartridge C is detachably mounted in the apparatus body 2.

The apparatus body 2 is configured to have an apparatus case 3 as its outer shape, a large ink character printing unit 62 disposed within the case, and a Braille embossing unit 64 disposed at a rear right side of the apparatus case 3. A keyboard 5 having a plurality of keys 4 such as alphabetic keys and function keys (e.g., select key, print key, key for translation into Braille, cursor key, and so forth) is disposed on a top-front surface of the apparatus case 3. A large opening and closing cover 7 is broadly disposed on a top-rear surface of the apparatus case 3, and an opening button 8 for opening the cover is disposed at a front side of the opening and closing cover 7. When the open button 8 is depressed to open the opening and closing cover 7, a cartridge mounting unit 6 on which the tape cartridge C is to be mounted is revealed. In addition, a rectangular display 9 for displaying results or the like input from the keyboard 5 is disposed at a surface side of the opening and closing cover 7.

A print-tape ejecting slot 18 for communication between the cartridge mounting unit 6 and an outside of the apparatus is disposed at a left side of the apparatus case 3, and a cutter unit 31 for cutting the processing tape T is built within the apparatus case 3 facing the print-tape ejecting slot 18. The cutter unit 31 is disposed toward the print-tape ejecting slot 18, and has a full cutter 33 for cutting the processing tape T like scissors by being driven by a motor (i.e., a full cutter motor 32) to form the tape piece Ta, and a half cutter 35 like scissors attached with a stopper which is disposed downstream of a tape feed direction with respect to the full cutter 33 and cuts (half cuts) only a recorded tape Tr of the processing tape T by being driven by a motor (i.e., a cutter motor 34). The recording tape Tr will be described later.

The Braille embossing unit 64 is disposed at a right side on the top-rear surface of the apparatus case 3. The Braille embossing unit 64 has an embossing tape inserting slot 11 (i.e., a sheet inserting slot) into which the front of the tape piece Ta is inserted with the printing surface of the tape piece Ta facing upward, and an embossing tape ejecting unit 12 for ejecting the embossed tape piece Ta. An embossing assembly 40 constituting the main body of the Braille embossing unit 64 is interposed between the embossing tape inserting slot 11 and the embossing tape ejecting unit 12. A manual guide 13, the width of which is capable of being adjusted, is disposed in the embossing tape inserting slot 11. Reference numeral 15 in FIG. 1 indicates an embossing unit cover for covering the embossing assembly 40.

A power supply port 16 for supplying the power, and a USB connector 17 for connecting with an external apparatus such as a data generation apparatus (not shown) are disposed at a right side of the apparatus case 3. That is, the label forming apparatus 1 is connected to the external apparatus to perform the ink character printing or the Braille character embossing on the basis of character information generated by the external apparatus. In addition, a circuit board (not shown) constituting a controller 60 that completely controls the apparatus body 2 is disposed within the apparatus case 3.

A print head 21 (thermal head) which has a heating element and is covered by the head cover 20, a positioning boss 22 for determining a position of a tape reel 26 to be described later, a platen driving shaft (not shown) for feeding the processing tape T and the ink ribbon R and facing the print head 21 of the tape cartridge C, and a winding driving shaft (not shown) for winding the ink ribbon R protrude from the cartridge mounting unit 6. In addition, a tape identification sensor 23 (see FIG. 4) having a plurality of micro-switches is disposed at a corner of the cartridge mounting unit 6 while a printing feed motor 24 driving the platen driving shaft and the winding driving shaft (see FIG. 4) or a reduction gear train (not shown) is provided at an inner side of the bottom plate of the cartridge mounting unit 6.

As shown in FIG. 2, the tape cartridge C is configured to receive the tape reel 26 for winding the processing tape T, a ribbon feeding reel 27, and a ribbon winding reel 30 which wind the ink ribbon R at a bottom right side of the cartridge case 25 within the cartridge case. Further, a through hole 28 into which the head cover 20 that covers the print head 21 is inserted is disposed at a bottom left side of the tape reel 26. Furthermore, a platen roller 29 is disposed, corresponding to a portion where the processing tape T and the ink ribbon R overlap and is fitted to the platen driving shaft so as to be rotated.

The processing tape T includes the record tape Tr formed of PET (polyethylene terephthalate), in which an adhesive is applied on a rear surface, and a peel tape Tp formed of PET attached to the record tape Tr by means of the adhesive, and is wound in a roll shape to be received within the cartridge case 25. A plurality of tapes having different widths are prepared for the processing tape T, and a plurality of detection holes (not shown) for identifying the kind of the processing tape T to be received are disposed on a rear surface of the cartridge case 25.

When the opening and closing cover 7 is opened so as to allow mounting of the tape cartridge C on the cartridge mounting unit 6, the through hole 28 is fitted to the head cover 20, the tape reel 26 to the positioning boss 22, the ribbon winding reel 30 to the winding driving shaft, and the platen roller 29 to the platen driving shaft, while the tape identification sensor 23 can detect a plurality of detection holes formed in the cartridge case 25. When the opening and closing cover 7 is closed in this state, the print head 21, in response to the closed state, brings the processing tape T and the ink ribbon R into contact with the platen roller 29 and then enters a print standby mode.

The ink character printing is performed by periodically rotating the platen driving shaft and the winding driving shaft and feeding the processing tape T and the ink ribbon R driven by the print head 21 on the basis of print data included in the label data. In this case, the ink ribbon R fed from the ribbon feeding reel 27 rotates around the wall of the through hole 28 to be wound on the ribbon winding reel 30. The processing tape T after being subjected to the ink character printing is half-cut at a predetermined position by the half cutter 35, a portion of the tape where the printing is completed is cut by the full cutter 33, and the cut tape piece Ta is ejected outside from the print-tape ejecting slot 18. In this case, the half-cut causes margins (resulted from the half-cut), which is not shown, to be generated at a leading end portion of the tape Ta with respect to the embossing assembly 40.

Figure 3A:
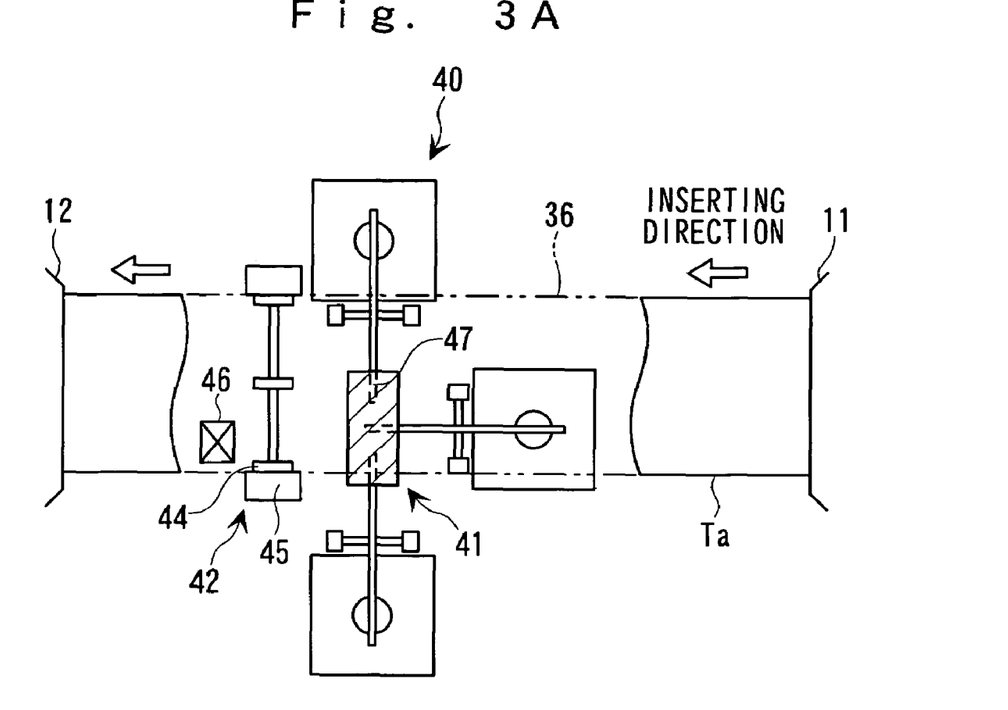
FIGS. 3A and 3B are a plan view and a cross-sectional diagram of an embossing unit, respectively.

As shown in FIG. 3A, the embossing assembly 40 has an embossing unit 41 (Braille embossing unit) which faces toward the tape transport path 36 connecting the embossing tape inserting slot 11 and the embossing tape ejecting unit 12 in a straight line, performs the Braille embossing, and is positioned near the half-side of the cartridge mounting unit 6 in a width direction of the tape transport path 36, and a tape feed unit 42 which feeds the tape piece Ta manually inserted from the embossing tape inserting slot 11 toward the embossing tape ejecting unit 12.

The tape feed unit 42 has a feed roller 44 for rotationally feeding the tape piece Ta, a roller pivoting unit 45 which pivotably supports the feed roller 44, an embossing feed motor 43 (see FIG. 4) capable of rotating the feed roller 44 in normal and reverse rotation directions, a power transmission unit (not shown) that transmits the power of the embossing feed motor 43 to the feed roller 44, and a leading end detecting mechanism 46 for detecting the leading end of the tape piece Ta to be fed. When the embossing feed motor 43 is driven, the feed roller 44, in response to the driving of the motor, rotates due to the operation of the power transmitting unit to feed the tape piece Ta. Further, the leading end of the tape piece Ta being fed is detected by the leading end detecting mechanism 46, and the Braille embossing is initiated by being triggered by the embossing unit 41.

Figure 3B:
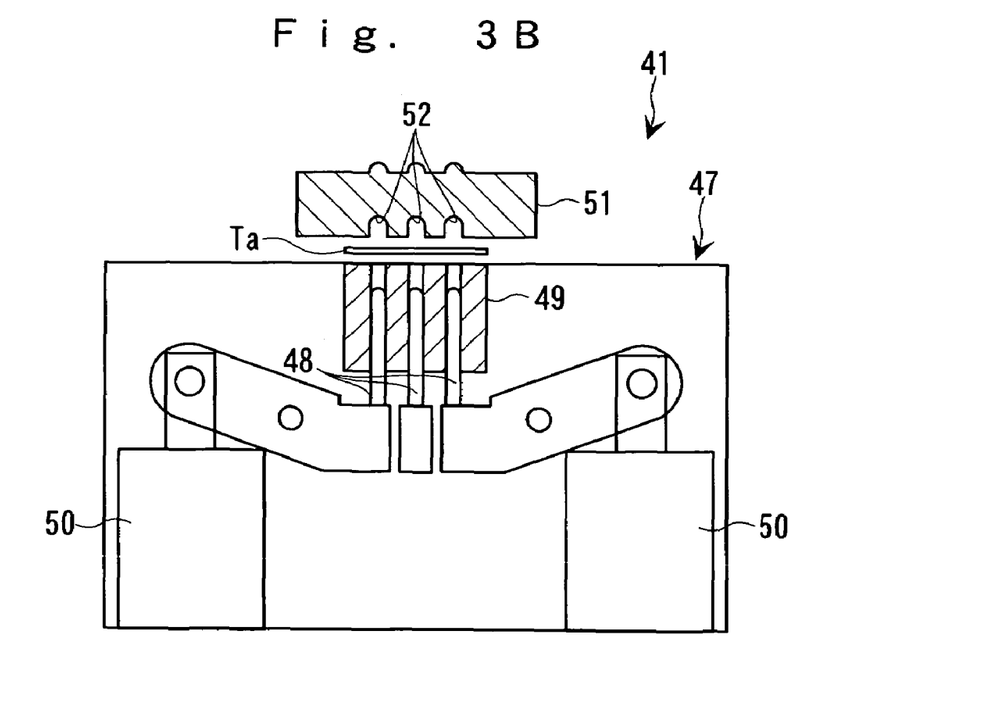

In addition, as shown in FIG. 3B, the embossing unit 41 has an embossing portion 47 disposed upstream of the tape feed direction with respect to the feed roller 44 and disposed downstream of the inserted tape piece Ta, and an embossing support portion 51 disposed at a position facing the embossing portion 47. The embossing portion 47 has three embossing pins 48 arranged to correspond to three embossing salients in a column among six embossing salients constituting a Braille character (six-dot Braille character), an embossing guide block 49 that movably guides embossing operations of the three embossing pins 48, and three solenoids 50 as a drive source. The embossing support portion 51 has three support grooves 52 corresponding to the three embossing pins 48. The tape piece Ta is fed by the tape feed unit 42 while the three embossing pins 48 are selectively flipped inside the support grooves 52 using the three solenoids 50 as a drive source so that the so-called six-dot embossing silent is formed on the tape piece Ta.

Figure 4:
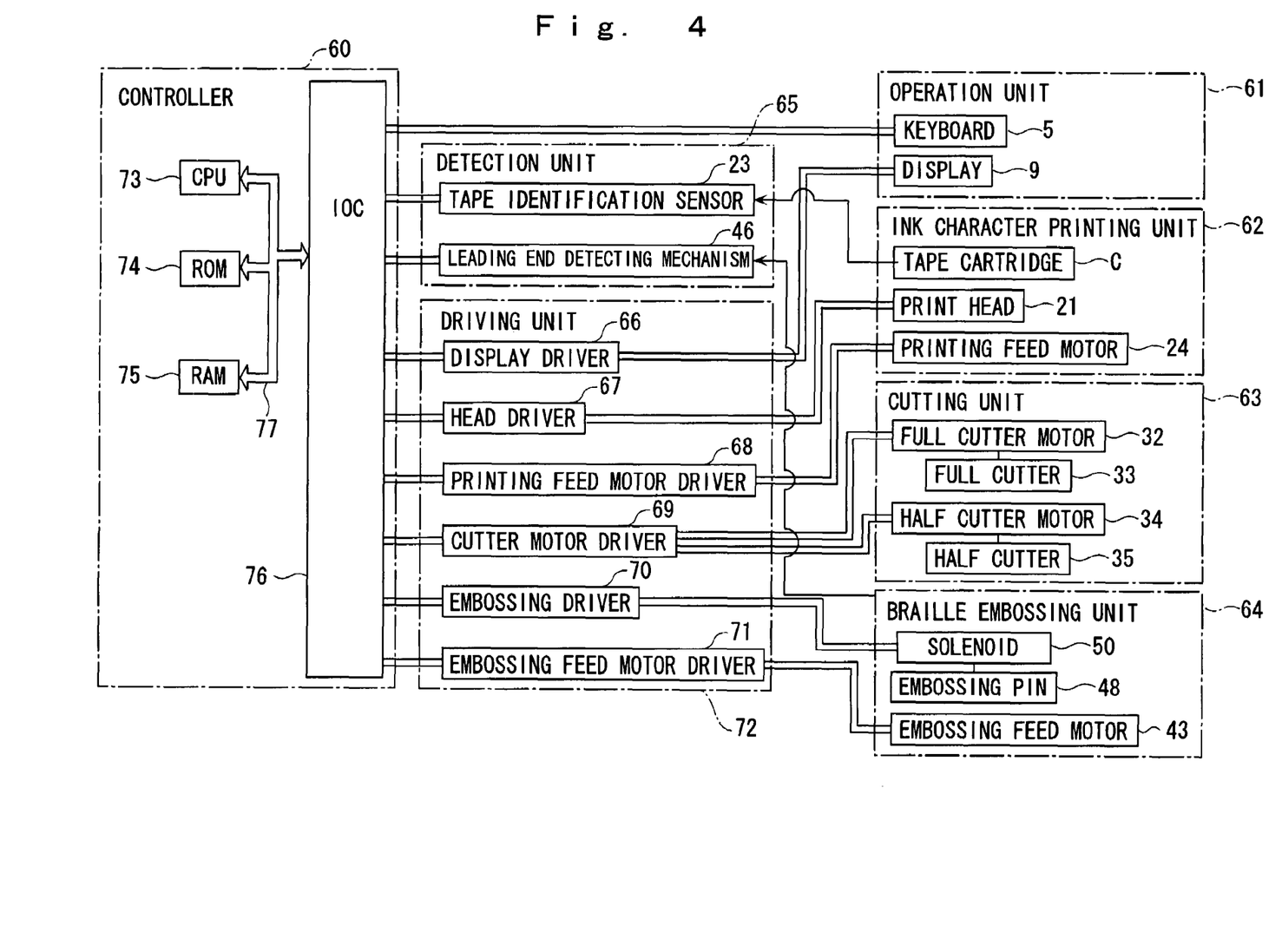
FIG. 4 is a control block diagram of the label forming apparatus.

Next, a structure of the controller of the label forming apparatus 1 will be described with reference to FIG. 4. The label forming apparatus 1 includes an operation unit 61 which has a keyboard 5 and a display 9 and functions as a user interface such as inputting of character information input by the user or displaying of various information, an ink character printing unit 62 having the tape cartridge C, the print head 21, and the printing feed motor 24 and printing print data on the basis of the character information input on the processing tape T while feeding the processing tape T and the ink ribbon R, and a cutting unit 63 which has the full cutter 33, the half cutter 35, the full cutter motor 32 for driving the full cutter 33, and the half cutter motor 34 for driving the half cutter 35, and performs the full-cut and half-cut of the processing tape T where the printing is completed.

Further, the label forming apparatus 1 includes a Braille embossing unit 64 which has solenoids 50, embossing pins 48 and an embossing feed motor 43 and transports the tape piece Ta while performing the Braille embossing on the tape piece Ta in response to the embossing data included in the label data on the basis of the character information, a detection unit 65 which has a plurality of sensors such as a tape identification sensor 23 or a leading end detecting mechanism 46 and performs various detections, a driving unit 72 having a display driver 66, a head driver 67, a printing feed motor driver 68, a cutter motor driver 69, an embossing driver 70, and an embossing feed motor driver 71 and drives each of the drivers, and a controller 60 for controlling the entire label forming apparatus 1.

The controller 60 has a CPU 73, a ROM 74, a RAM 75, and an IOC (Input Output Controller) 76, which are connected to one another by an internal bus 77. The controller 60 allows the CPU 73 to control each of the units of the label forming apparatus 1 by inputting various signals and data from respective units of the label forming apparatus 1 by the IOC 76, processing various data within the RAM 75 on the basis of the input various signals and data, and outputting the various signals and data to the respective units within the label forming apparatus 1 by the IOC 76 in response to the control program installed in the ROM 74.

For example, a software (i.e., a data generation program) for generating the label data is stored in the controller 60 (ROM 74). When the data generation apparatus 1 is turned on, the controller 60 controls the operation unit 61 on the basis of the data generation program, and an input screen for inputting input data such as character information or various setting data is displayed on a display 9. Further, the controller 60 processes the data (i.e., the label forming process) input from the input screen on the basis of the data generation program, so that print data and/or embossing data, which becomes the label data, are generated.

Hereinafter, a method of generating the label data will be described. 'A print input mode' which inputs character information and various setting data (hereinafter, they will be referred to as print input data) to generate the print data, and 'an Braille input mode' which inputs character information and various setting data (hereinafter, they will be referred to as Braille input data) to generate the embossing data are prepared as an input mode for input data in the data generation program, and the print input data and the Braille input data are input as input data from the input screen dedicated to each of the input modes.

Figure 5A:
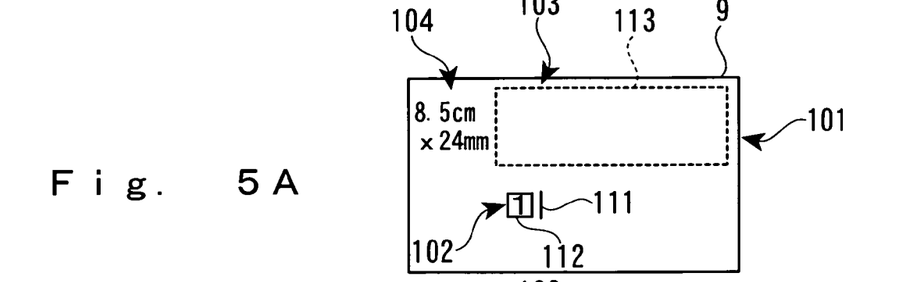
FIGS. 5A to 5E are diagrams illustrating screen transitions when printing characters are input onto an input screen in an input mode for printing, and then changes the input screen into an input screen in a Braille input mode to input Braille characters using a mode selection menu.
Figure 5B:
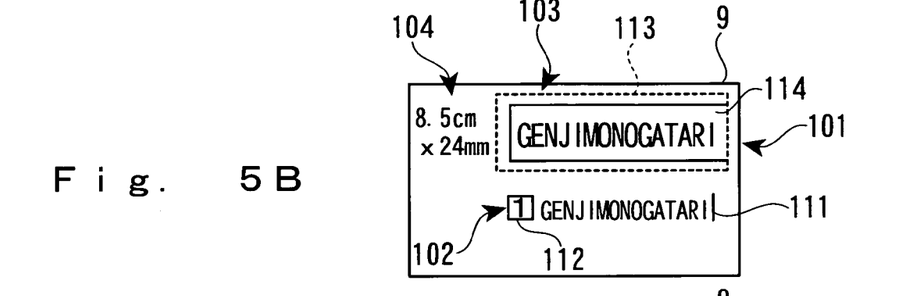
Figure 5C:
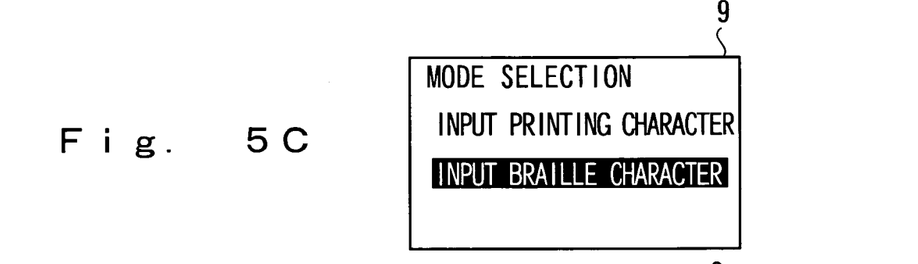

The input mode is set by the mode selection menu, and when a predetermined key operation is performed in a state in which the input screen of each mode is displayed, the mode selection menu is displayed (See FIG. 5C).

When 'the print input mode' is selected in the mode selection menu, the input screen 101 of the print input mode is displayed, allowing the character information of the print input data to be input on a character basis. In the present embodiment, 'the print input mode' is set as a default, and the input screen 101 of the print input mode is displayed when the apparatus is turned on. As shown in FIGS. 5A and 5B, the input screen 101 of the print input mode is used for inputting characters (including numerals, graphic symbols, and so forth) to be printed on the label, and has a print character input portion 102 which displays an input character as an ink character, and a bar-shaped cursor 111 which indicates an input position of the character, so that the print input data is generated on the basis of the character input in the position. A row number 112 is first displayed in the print character input portion 102 and an input character is input following the row number 112. Accordingly, the user can easily recognize a row to which the print character being input (or to be input) belongs.

In addition, as shown in FIGS. 5A and 5B, the input screen 101 of the print input mode has an image display portion 103 for displaying a label image 114 on a display region 113, and a size display portion 104 for displaying the label size of the label to be generated (i.e., vertical length and horizontal length) on the basis of the character (print character) input from the print character input portion 102.

The size of the display 9 is small when the label forming apparatus is relatively small-sized, so that the number of characters which is capable of being displayed on the print character input portion 102, and the display region 113 of the image display portion 103 for displaying the label image 114 are limited. Accordingly, the print character input portion 102 and the image display portion 103 can display the input characters and the label image 114 so as to be scrolled, thereby allowing the user to recognize the entire label image 114.

When the generated label image 114 is not included in the display region 113 of the image display portion 103, some of the label image 114 are partially displayed to allow the label image 114 to be scrolled in accordance with the cursor position in the print character input portion 102. That is, a position indicated by the cursor 111 on the print character input portion 102 is displayed on a predetermined position of the display region 113. (so as to have the character adjacent to the right side of the cursor 111 positioned at the end of the display region 113 in the present embodiment), for example, the label image 114 is scrolled to the right when the cursor 111 moves to the right on the print character input portion 102, and is scrolled to the left when the cursor moves to the left. As such, the label image 114 is scrolled on the print character input portion 102 following the movement of the cursor 111.

Figure 5D:
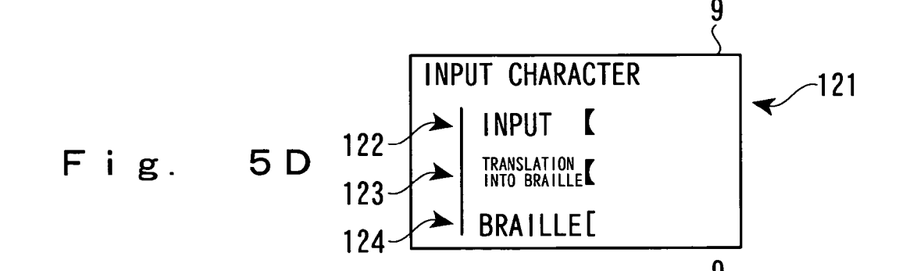
Figure 5E:
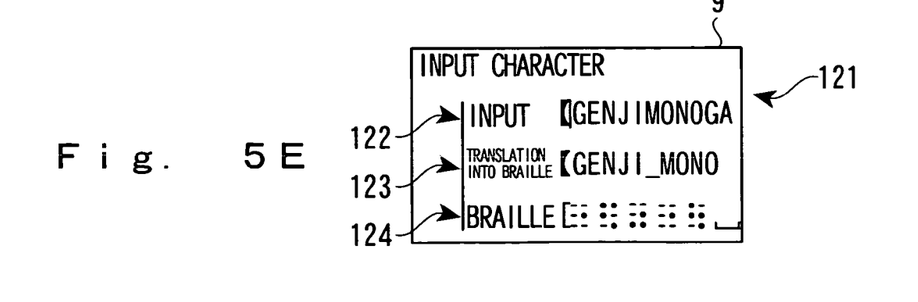

Alternatively, when 'the Braille character input mode' is selected in the mode selection menu, the input screen 121 of the Braille character input mode is displayed to allow character information of the Braille character input data to be input on a character basis. As shown in FIGS. 5D and 5E, the input screen 121 of the Braille character input mode has a Braille character input portion 122 used for inputting Braille characters to be embossed on the label and displaying the input characters as ink characters, a translated Braille representing portion 123 for representing translation results into Braille with respect to the characters input from the cursor 111 for indicating the input position of the characters and the Braille character input portion 122, and a translated ink character representing portion 124 for representing the ink characters translated from the Braille characters. When characters are input from the Braille character input portion 122 and then a predetermined key operation (e.g., depression of the key for the translated Braille) is performed, data translated into Braille (which leave a space between words in accordance with the Braille character rule), which become Braille character input data, are generated on the basis of the input characters. On the basis of the data translated into Braille, the Braille character notation when the input characters input as ink characters in the Braille character input portion 122 are translated into Braille is displayed in the translated Braille representing portion 123, and its translation into ink characters is displayed in the translated ink character representing portion 124 as Katakana characters.

In the present embodiment, inputting (including editing such as erasing) of the character information of the input Braille character data cannot be done from the translated Braille representing portion 123 and the translated ink character representing portion 124. Accordingly, the cursor 111 can move to any of the Braille character input portion 122, the translated Braille representing portion 123, and the translated ink character representing portion 124. However, when the cursor 111 is positioned on the translated Braille representing portion 123 or the translated ink character representing portion 124, its display is highlighted for negative display, which indicates that editing or inputting are not allowed in the translated Braille representing portion 123 and the translated ink character representing portion 124. In addition, the cursor 111 is displayed to align vertically a plurality of white dots, which indicates that editing and inputting cannot be done by the translated Braille representing portion 123 and the translated ink character representing portion 124 (In this case, this display method is almost the same as the display method when the cursor 111 is matched to an input Braille display portion 131 to be described later (See FIGS. 7B to 7D)).

When data is input from the input screens 101 and 121 (of the respective input modes) and then a predetermined key operation is performed, label data processing is performed by the controller 60 so that the label data is generated on the basis of the input data. In this case, when the print input data and the Braille input data are input as the input data, the label data for generating the label on which both of the ink character printing and the Braille embossing are performed are generated. That is, the print data is generated from the print input data while the embossing data is generated from the Braille input data as the label data.

When the label data of a label having the ink and Braille characters are generated, an input order between the print input data and the Braille input data is arbitrary. Alternatively, it is possible to input the data by preferably switching the input mode in the mode selection menu.

In addition, when the Braille input data does not exist and only the print input data is input as the input data at the time of executing the label data creating process, only the print data is generated as the label data, and the label data for generating the label with only the ink characters (i.e., an ink character label) is generated. In the same way, when the print input data does not exist and only the Braille input data is input as the input data, only the embossing data is generated as the label data, and the label data for generating the label with only the Braille characters (i.e., a Braille character label) is generated.

However, in the input screen 101 of the print input mode, the label image 114 displayed on the above-described image display portion 103 indicates the label image 114 of the label generated on the basis of the input data, and when Braille data is already input as the input data while the input screen 101 of the print input mode is displayed, an embossing image of the Braille character to be embossed on the label is displayed on the image display portion 103 as the label image 114 on the basis of the Braille data that is being input. In this state, when the print characters are input from the print character input portion 102, a label image 114 which has both the printed ink characters and the embossed Braille characters on the basis of both of the print input data and the Braille input data (See FIGS. 6 to 8A to 8C) is displayed.

The label image 114 with the print characters and the Braille characters can be scroll-displayed, however, a length difference between the character string of the print characters and the character string of the Braille characters, or a layout method of the print and Braille characters on the label does not allow the entire label image 114 to be scroll-displayed.

That is, the scroll display of the present embodiment scrolls the label image 114 so that the position indicated by the cursor 111 is displayed on a predetermined position of the display region 113, and when the label image 114 is configured to be scroll-displayed on the basis of the cursor position only in the print character input portion 102, a portion corresponding to the Braille characters protruding more than the print characters cannot be displayed when the Braille characters protrude more than the print characters in the direction before and after the label (i.e., a reading direction), for example, when a character string length of the Braille characters is longer than a character string length of the print characters or the character string of the Braille characters is established at the front or back side of the character string of the print characters. In the present embodiment, the cursor 111 is moved by the cursor keys disposed on the keyboard 5.

In particular, the Braille character notation often tends to have longer Braille characters than the ink characters (i.e., the print characters) even if they have the same contents due to several facts in which the Braille characters are represented in accordance with the Japanese characters (i.e., Katakana), the Braille characters has a specific symbol for discrimination from alphanumeric and voiced sound symbol, and a space is formed between words in accordance with the Braille character rule, and thus significantly inconveniences to a user when the Braille character portion protruding from the print characters cannot be displayed.

Accordingly, when the Braille character input data (Braille character data) are already input as the input data in a case in which the input screen 101 of the print input mode is displayed in the label forming apparatus of the present embodiment, the input Braille display portion 131 (Braille display region) displaying the ink characters in Katakana characters translated from the Braille characters to be embossed on the basis of the Braille character data is made to be inserted in the input screen 101 of the print input mode (between the print character input portion 102 (an ink character region) and the image display portion 103) (see FIGS. 6A to 6C to 8A to 8C). And the label image 114 can be scroll-displayed so as to correspond to not only the movement of the cursor 111 in the print character input portion 102 but also the movement of the cursor 111 in the input Braille display portion 131.

As such, when the label image 114 indicating the Braille characters is displayed in the input screen 101 of the print input mode, the user can advantageously recognize the fact that the Braille character data is already input and its contents even from the input screen 101 of the print input mode.

The input Braille display portion 131 will be first described. As shown in FIGS. 6A to 6C and 7A to 7D, the input Braille display portion 131 is disposed on the upper side of the print character input portion 102 and is displayed along with the print character input portion 102 parallel to each other. A Braille mark 132 (i.e., a Braille character cell image indicating six dots constituting one Braille character), which corresponds to the display position of the row number 112 of the print character input portion 102 and indicates the display on the basis of the Braille character data, is displayed on the input Braille display portion 131, and a translation into the ink character is displayed following the Braille mark 132.

Accordingly, the user can distinguish the translation into ink characters displayed on the input Braille display portion 131 from the print characters input in the print character input portion 102.

The translation into ink characters displayed on the input Braille display portion 131 has the same contents as the contents in the translated ink character representing portion 124. Further, a space mark 133 indicating a space is displayed on the position which leaves a space corresponding to one cell as shown in FIGS. 6A to 6C and 7A to 7D. As described above, input of the print characters and input of the Braille characters are performed in the different input modes from each other in the present embodiment, so that contents (Braille character data) displayed on the input Braille display portion 131 cannot be amended nor changed, and new input of Braille characters is not possible, either.

However, when Braille characters need not to be embossed on the label, since Braille data does not required, it is difficult that the input mode is switched into the Braille character input mode to erase characters input in the Braille character input portion 122 and then the input mode is switched again into the print input mode. Therefore, a predetermined operation can be performed on the input screen 101 of the print input mode to collectively erase the Braille character data.

Next, the scroll of the label image 114 in the input screen 101 of the print input mode when the print input data as the input data and the print input mode are input will be described in detail with reference to FIGS. 6A to 6C and 7A to 7D with an example in which 'GENJIMONOGATARI' (which is a string of Kanji characters) is input as the print input data and 'GENJI MONOGATARI' (which is a string of Katakana characters) is input as the Braille input data. Note that the strings of the characters input in the print character input portion 102 and the input Braille display portion 131 are expressed by alphabetic characters in the corresponding figures (e.g., FIGS. 6A to 6C, 7A to 7D, and 8A to 8C) for the sake of convenience, although they are actually expressed by the Kanji characters and the Katakana characters. Also, the Braille characters as seen in the label image 114 of the input screen 101 correspond to the Japanese characters of GENJI-MONOGATARI.

When 'GENJIMONOGATARI' is input as the print input data and 'GENJI MONOGATARI' is input as the Braille input data, 'GENJIMONOGATARI' is displayed on the print character input portion 102 following the row number 112. In the same way, 'GENJI MONOGATARI' is displayed on the input Braille display portion 131 following the Braille mark, however, 'GENJI' and 'MONOGATARI' are spaced apart from each other, so that a space mark 133 is inserted between the 'GENJI' and 'MONOGATARI'.

The label image 114 noting the ink character and the Braille characters in a top-and-bottom direction is displayed on the image display portion 103. In the present embodiment, the position of the character indicated by the cursor 111 is set to be displayed on a predetermined position of the display region 113 of the image display portion 103, and the cursor 111 is positioned at the front side (i.e., at the left side) of the Kanji character 'GEN' in the print character input portion 102 in FIG. 6A, so that the label image 114 is displayed so as to have the Kanji character 'GEN' positioned on a predetermined position of the display region 113 (i.e., so as to have the character positioned at the end of the display region 113 in the present embodiment). In the drawing, the ink characters are arranged and displayed at the upper side of the Braille characters, however, the layout of the ink and Braille characters can be preferably edited from the input screens 101 and 121 of the individual modes.

Figure 6A:
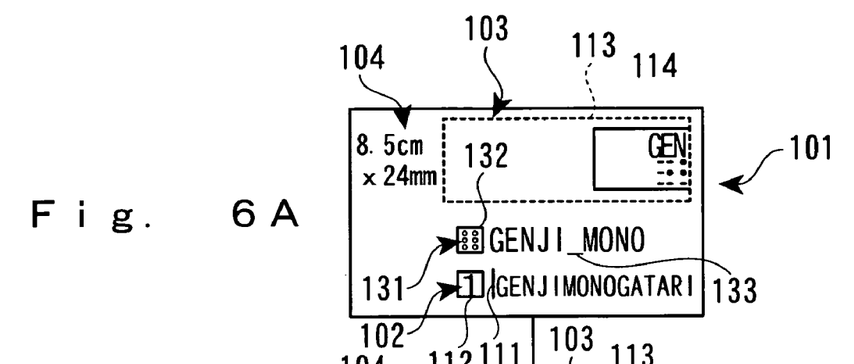
FIGS. 6A to 6C are explanatory diagrams when the label image is scrolled by adjusting a cursor in an input unit for printing character, and illustrate screen transitions at the time of scrolling.
Figure 6B:
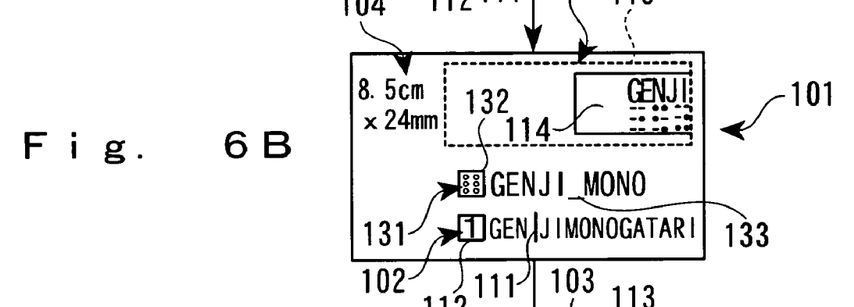
Figure 6C:
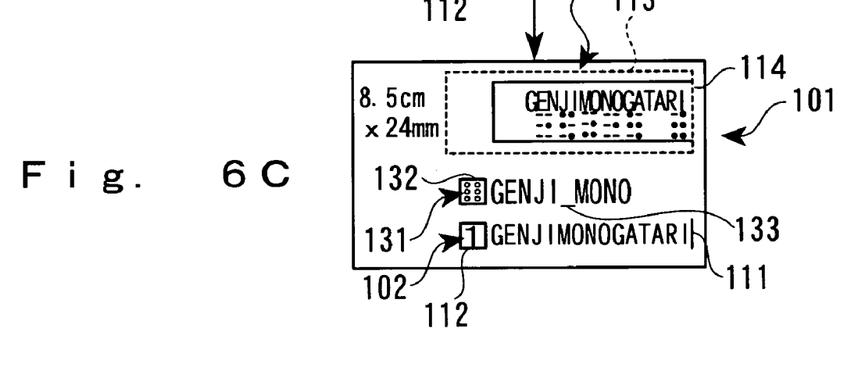

A case in which the cursor 111 is matched to the print character portion 102 to scroll the label image 114 will be first described. When the cursor 111 moves to the right (left) by one character from the state shown in FIG. 6A, the label image 114 also moves to the right (left) by one character (See FIGS. 6B and 6C). And when the cursor 111 moves to the right from the state shown in FIG. 6C while the cursor 111 is positioned at the right side of the Kanji character 'GATARI', that is, at the end of the character string input in the print character input portion 102, the cursor 111 moves to the leading side of the character string input in the print character input portion 102 so that the label image 114 is also displayed as shown in FIG. 6A.

Figure 7A:
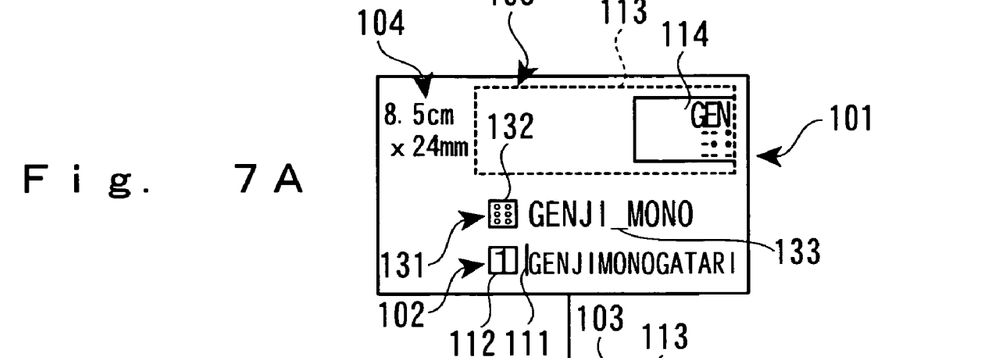
FIGS. 7A to 7D are explanatory diagrams when the label image is scrolled by adjusting a cursor in an input Braille character display unit, and illustrate screen transitions at the time of scrolling.
Figure 7B:
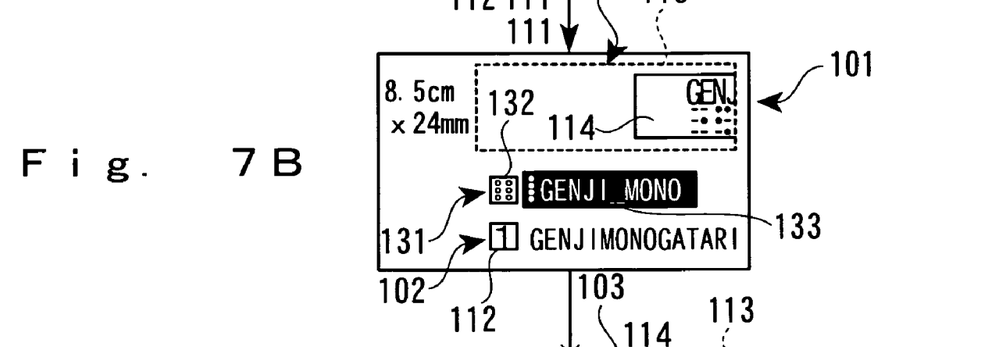

Subsequently, a case in which the cursor 111 is matched to the input Braille display portion 131 to scroll the label image 114 will be described with reference to FIGS. 7A to 7D. When the cursor 111 moves to the input Braille display portion 131 from the print character input portion 102 (by means of key operation) from the state shown in FIG. 7A, the input Braille display portion is highlighted as shown in FIG. 7B to cause the translation into ink characters to be negative-displayed in the input Braille display portion 131. As such, displaying the cursor 111 positioned on the print character input portion 102 is made to be different from displaying the cursor positioned on the input Braille display portion 131, so that the cursor 111 indicates the required position between the print character input portion 102 and the input Braille display portion 131. Further, in the present embodiment, as described above, Braille characters that are already input in the input Braille display portion 131 cannot be changed and no other Braille character can be input therein, so that the cursor is made to be negative-displayed (i.e., represented) when the cursor 111 is positioned on the input Braille display portion 131, which allows a user to easily recognize that the translation into ink characters displayed on the input Braille display portion 131 cannot be changed.

Figure 7C:
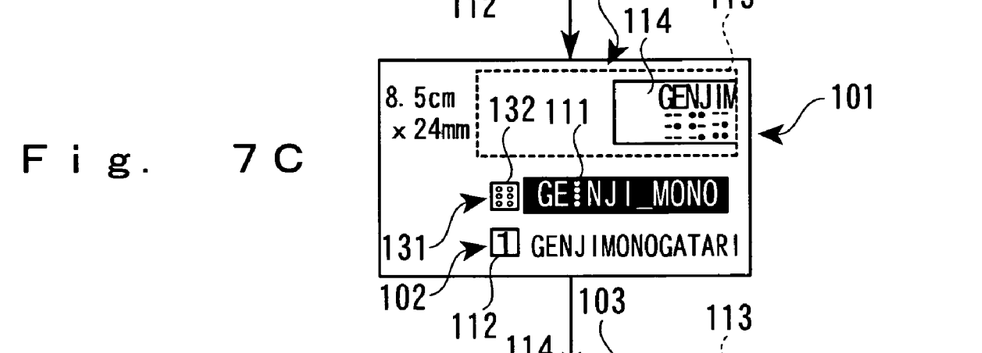
Figure 7D:
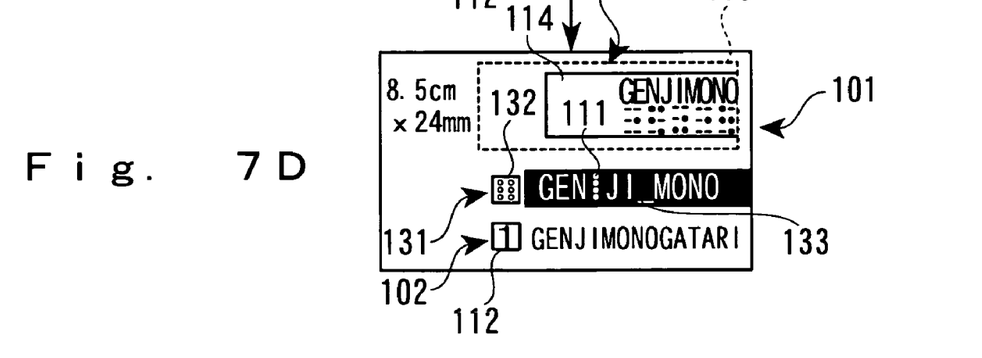

In addition, the cursor 111 on the input Braille display portion 131 is not just a bar shape having a white color, but is displayed by a plurality of white dots (four dots) which are vertically aligned (See FIGS. 7B to 7D). As such, since shapes of the cursor 111 on the print character input portion 102 and the cursor 111 on the input Braille display portion 131 are changed, it is possible to indicate that the translation into ink characters displayed on the input Braille display portion 131 cannot be changed.

Even in the input Braille display portion 131, relationship between the movement of the cursor 111 and the movement of the label image 114 is almost the same as the case of the print character input portion 102, and the position of the Braille character corresponding to the Katakana character of the translation into ink characters indicated by the cursor 111 is displayed so as to be positioned in the predetermined position of the display region 113 of the image display portion 103, that is, so as to display the Braille characters corresponding to the Katakana character adjacent to the right side of the cursor 111 at the end of the display region 113. Further, when the cursor 111 moves so that the Katakana characters of the translation into ink characters indicated by the cursor 111 (to the right or left direction) are shifted by one character, the display of the label image 114 is also correspondingly scrolled for every cell.

Above all, when a character corresponding to one ink character translated from two Braille characters such as voiced sound symbol and half voiced sound symbol, or an alphabet or alphanumeric where foreign language characters or numerals are inserted, is moved by the cursor, the amount of scrolling the label image 114 corresponds to two cells even when the number of the characters corresponding to movements of the cursor 111 of the input Braille display portion 131 is one. For example, the amount of scrolling becomes one cell corresponding to the Braille cell of the Katakana character 'N' when the cursor 111 and the Katakana character 'GE' move to the right from the state shown in FIG. 7B, and becomes two cells corresponding to the Braille cell of the Katakana character 'JI' when the cursor 111 and the Katakana character 'N' move to the right (See FIGS. 7C and 7D).

Figure 8A:
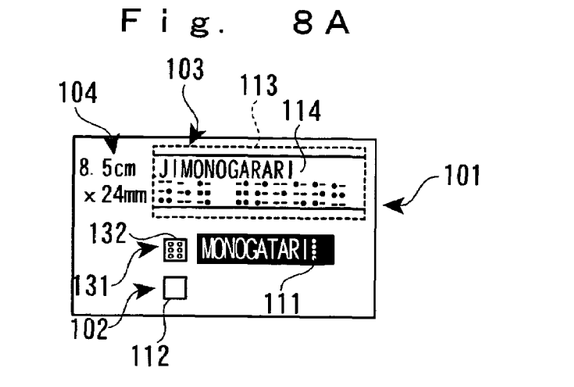
FIG. 8A is an explanatory diagram of a screen when the cursor is positioned at the end of the input Braille character display unit.
Figure 8B:
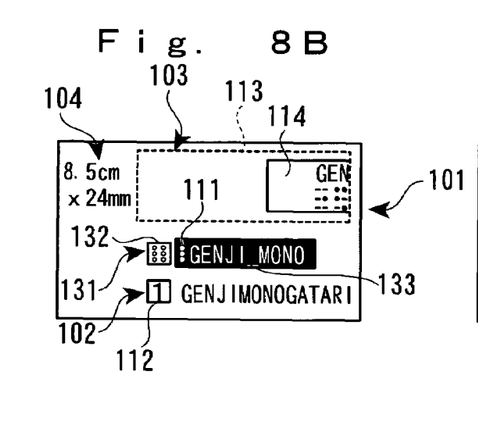
FIG. 8B is an explanatory diagram of a screen when the cursor is moved further right from the state shown in FIG. 8A.

When the cursor 111 in the input Braille display portion 131 moves to be positioned at the right side of the Katakana character 'RI', that is, at the end of the translation into ink character displayed on the input Braille display portion 131 as shown in FIG. 8A, the cursor 111 moves to the leading side of the character string of the translation into ink character displayed on the input Braille display portion 131 when the cursor 111 further moves to the right so that the label image 114 is correspondingly scrolled as shown in FIG. 8B.

Figure 8C:
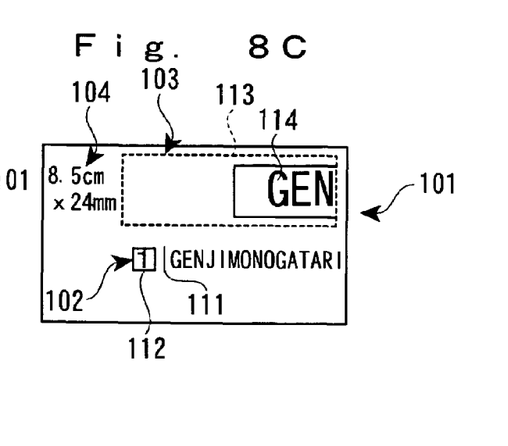
FIG. 8C is an explanatory diagram of a screen when a predetermined operation is performed in the state shown in FIG. 8A to batch-erase Braille data.

When a predetermined key operation is performed if the cursor 111 is positioned at the right of 'RI', this key operation is triggered to initiate batch-erase processing of the Braille character data so that the Braille character data is collectively erased, which in turn influences the label image 114 where the Braille character data is collectively erased, so that the label image in which the Braille character image is erased is displayed as shown in FIG. 8C.

As described above, according to the tape processing apparatus 1 to which the present invention is applied, the label image 114 can be scrolled on the basis of the cursor positions in the print character input portion 102 and the input Braille display portion 131, so that the whole label image 114 can be displayed to improve the convenience of a user even when the number of characters in the print character input portion 102 is different from the number of characters in the input Braille display portion 131. In addition, the cursor position can be matched to a portion desired by the user so that the label image 114 can be matched to correspond to the portion and displayed, and the user can recognize the matched characters and label image 114 which are displayed on the print character input portion 102 and the input Braille display portion 131.

In addition, the translation into ink character displayed on the input Braille display portion 131 cannot be changed in the input screen 101 of the print input mode, and the display when the cursor 111 moves to the input Braille display portion 131 is negative-displayed to have the display form of the cursor 111 different from the display form of the print character input portion 102 which allows input and edition to be performed, so that the user can easily recognize the fact that the input and edition can be performed in the input Braille display portion 131.

It is also possible that proper changes can be made to the structure of the label forming apparatus 1 besides the above-described embodiments in a range without departing from the spirit of the present invention. For example, the translation into ink character of the input Braille character is displayed in katakana characters on the input Braille display portion 131 in the present embodiments, however, the Braille character notation can also be displayed on the same display portion.

In addition, when the display of the label image 114 is scrolled to correspond to the translation into ink character of the input Braille display portion 131 in the present embodiments, the display is scrolled by the amount of Braille character cells corresponding to one character of the translation into ink character, however, the display of the label image 114 may be scrolled by the same magnitude on the basis of the rate of the number of characters of the translation into ink character and the number of the Braille character cells corresponding to the translation. For example, three characters of the translation indicated as the Katakana character 'GENJI' may be displayed using five Braille character cells, and five-thirds of the Braille character cells correspond to one ink character. Accordingly, in this case, when the cursor 111 is scrolled in an order of 'GE', 'N' and 'JI' in the input Braille display portion 131, the display of the label image 114 is scrolled by the amount of five-thirds of the Braille character cells. Accordingly, the character of the translation into ink character indicated by the cursor 111 can be matched to the position of the Braille character (cell) of the label image 114 in the input Braille display portion 131.

What is claimed is:

1. A data display method of a data display apparatus that selectively displays a cursor that scrolls a label image of a composite label in an ink character region or a Braille character region of a display screen, the display screen having the ink character region that displays input ink characters, the Braille character region that displays input Braille characters or ink characters translated from the Braille characters, and a preview region that previews the label image on which the ink characters are printed and the Braille characters are embossed, the method comprising:

scrolling the label image to correspond a cursor position to the ink characters displayed in the ink character region with the ink characters on the label image previewed in the preview region when the cursor is displayed in the ink character region; and scrolling the label image to correspond the cursor position to the Braille characters or the translated ink characters displayed in the Braille character region with the Braille characters on the label image previewed in the preview region when the cursor is displayed in the Braille character region.

2. A data display apparatus comprising:

a display screen having an ink character region that displays input ink characters, a Braille character region that displays input Braille characters or ink characters translated from the Braille characters, and a preview region that previews a label image of a composite label on which the ink characters are printed and the Braille characters are embossed;

a cursor display device that selectively displays a cursor scrolling the label image in the ink character region or the Braille character region; and a preview control device that scrolls the label image to correspond a cursor position to the ink characters displayed in the ink character region with the ink characters on the label image previewed in the preview region when the cursor is displayed in the ink character region, and scrolls the label image to correspond the cursor position to the Braille characters or the translated ink characters displayed in the Braille character region with the Braille characters on the label image previewed in the preview region when the cursor is displayed in the Braille character region.

3. A data generation apparatus comprising:

a data display apparatus according to claim 2;

an ink character edition input device that edits and inputs ink characters;

a Braille character edition input device that edits and inputs Braille characters; and an indication display device that displays an indication of which of the ink characters or the Braille characters are in a state capable of being edited on the basis of a cursor position of the cursor, wherein the data generation apparatus generates label data for creating the composite label on the basis of the input ink characters and the Braille characters, and the cursor indicates an edit input position in the ink character region and the Braille character region.

4. The data generation apparatus according to claim 3, further comprising:

a batch-erase device that collectively erases the Braille characters by triggering a predetermined operation when the cursor is positioned in the Braille character region.

5. A sheet processing apparatus, comprising:

a data generation apparatus according to claim 3;

a printing device that performs ink character printing on a sheet to be processed on the basis of input ink characters; and an embossing device that embosses Braille characters on the sheet on the basis of input Braille characters.

* * * * *